US012793201B2

(12) United States Patent
Kwak

(10) Patent No.: US 12,793,201 B2
(45) Date of Patent: Nov. 10, 2026

(54) TRAINING SCANNING ELECTRON MICROSCOPY IMAGE SELECTION METHOD AND SEM EQUIPMENT ALIGNMENT METHOD USING THE SAME

(71) Applicant: SAMSUNG ELECTRONICS CO., LTD., Suwon-si (KR)

(72) Inventor: Nohong Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 18/417,764

(22) Filed: Jan. 19, 2024

(65) Prior Publication Data

US 2024/0320816 A1 Sep. 26, 2024

(30) Foreign Application Priority Data

Mar. 24, 2023 (KR) ........................ 10-2023-0039132
Apr. 24, 2023 (KR) ........................ 10-2023-0053577

(51) Int. Cl.
*G06T 7/00* (2017.01)
*G01N 23/2251* (2018.01)
*G06T 11/00* (2026.01)

(52) U.S. Cl.
CPC ............ *G06T 7/0006* (2013.01); *G06T 7/001* (2013.01); *G06T 11/00* (2013.01);
(Continued)

(58) Field of Classification Search
CPC ..................... G06T 7/001; G06T 11/00; G06T 2207/10061; G06T 2207/20081;
(Continued)

(56) References Cited

U.S. PATENT DOCUMENTS 10,318,805 B2 6/2019 Nakayama et al.
10,733,744 B2 8/2020 Ha et al.
(Continued)

FOREIGN PATENT DOCUMENTS

KR 20220166326 A 12/2022
KR 20230020818 A 2/2023

OTHER PUBLICATIONS

Nam, Yunhyoung, et al. "Precise pattern alignment for die-to-database inspection based on the generative adversarial network." IEEE Transactions on Semiconductor Manufacturing 35.3 (2022): 532-539. (Year: 2022).*

*Primary Examiner* — Sumati Lefkowitz
*Assistant Examiner* — Connor L Hansen
(74) *Attorney, Agent, or Firm* — Wolf, Greenfield & Sacks, P.C.

(57) ABSTRACT

A training scanning electron microscope (SEM) image selection method includes setting a plurality of patterns of SEM images as samples, performing training on a plurality of training patterns, respectively, to generate a conversion model, converting the training patterns into a plurality of converted design patterns by using the conversion model, comparing the plurality of converted design patterns with the corresponding design image pattern to determine misalignment therebetween, obtaining, for each of the plurality of training patterns, effective distances which are smallest values of distances from each of the plurality of training patterns to a pattern that is misaligned, extracting the training pattern having a maximum effective distance as an optimal training pattern, deleting the samples that are within the maximum effective distance in the optimal training pattern, and determining whether all the samples are aligned.

20 Claims, 16 Drawing Sheets

(52) U.S. Cl.
CPC ... *G01N 23/2251* (2013.01); *G01N 2223/401* (2013.01); *G01N 2223/418* (2013.01); *G01N 2223/6116* (2013.01); *G06T 2207/10061* (2013.01); *G06T 2207/20081* (2013.01); *G06T 2207/20084* (2013.01); *G06T 2207/20212* (2013.01); *G06T 2207/30148* (2013.01); *G06T 2210/32* (2013.01)

(58) Field of Classification Search
CPC ............. G06T 2207/30148; G06T 5/60; G06T 7/0004; G01N 23/2251; G06N 3/0475; G06N 3/094
See application file for complete search history.

(56) References Cited

U.S. PATENT DOCUMENTS

| | | | | |
|---|---|---|---|---|
| 2020/0211178 | A1 | 7/2020 | Zhou et al. | |
| 2022/0283496 | A1 | 9/2022 | Lai et al. | |
| 2022/0375051 | A1 | 11/2022 | Brauer et al. | |
| 2022/0404712 | A1* | 12/2022 | Zhang .................... | G06V 10/82 |
| 2023/0043003 | A1 | 2/2023 | Kwak et al. | |
| 2023/0115188 | A1 | 4/2023 | Kwak et al. | |
| 2023/0161269 | A1 | 5/2023 | Huang et al. | |

* cited by examiner

TRAINING SCANNING ELECTRON MICROSCOPY IMAGE SELECTION METHOD AND SEM EQUIPMENT ALIGNMENT METHOD USING THE SAME

CROSS-REFERENCE TO RELATED APPLICATION

This application is based on and claims priority under 35 U.S.C. § 119 to Korean Patent Application No. 10-2023-0039132, filed on Mar. 24, 2023 and Korean Patent Application No. 10-2023-0053577, filed on Apr. 24, 2023, in the Korean Intellectual Property Office, the disclosures of which are incorporated by reference herein in their entireties.

BACKGROUND

The inventive concept relates to a scanning electron microscopy (SEM) equipment alignment method, and more particularly, to a training SEM image selection method.

The SEM technology has been widely known as that devices and wiring patterns on a semiconductor substrate are scanned into an SEM image in SEM equipment and the differences are inspected between the SEM image and a design image. However, according to the conventional inspection method, the similarity is measured between images, or the same features, which have been found, are compared and aligned between images, so that there is a limitation that the shape or vector component needs to be similar between images. Accordingly, when inspecting heterogeneous images, the comparison and alignment may be difficult between heterogeneous images, and thus, the inspection on the heterogeneous images often fails. When the inspection fails, an operator has no choice but to proceed with direct comparison and alignment, and thus, it may take a lot of time and cost to proceed with the direct comparison and alignment.

SUMMARY

The inventive concept provides a training scanning electron microscopy (SEM) image selection method and an SEM equipment alignment method in which SEM equipment is accurately aligned based on the selected training SEM image.

In addition, the problems to be solved by the inventive concept are not limited to the above-described problems, and some other problems are clearly understood by one of ordinary skill in the art from the following descriptions hereinafter.

According to an aspect of the inventive concept, there is provided a training SEM image selection method including setting a plurality of patterns of SEM images as samples, performing training on each of a plurality of training patterns to generate a conversion model between a design image pattern and the plurality of training patterns, converting the plurality of training patterns into a plurality of converted design patterns using the conversion model, comparing the plurality of converted design patterns with the design image pattern to determine misalignment therebetween, obtaining, for each of the plurality of training patterns, effective distances which are smallest values of distances from each of the plurality of training patterns to a pattern that is misaligned, extracting one of the plurality of training patterns having a maximum effective distance as an optimal training pattern, deleting the samples that are within the maximum effective distance in the optimal training pattern, and determining whether all the samples are aligned.

According to another aspect of the inventive concept, there is provided a training SEM image selection method including obtaining a plurality of SEM images for a measurement target using SEM equipment, performing preprocessing on the plurality of SEM images and corresponding design images, selecting training SEM images from the plurality of SEM images, performing training based on the training SEM images and the corresponding training design images to generate a first conversion model between the plurality of SEM images and the corresponding design images, and converting the plurality of SEM images into converted design images using the first conversion model, wherein the selecting the training SEM images includes setting a plurality of patterns of the plurality of SEM images as samples, performing training on each of a plurality of training patterns to generate a second conversion model between a design image pattern and the plurality of training patterns, converting the plurality of training patterns into a plurality of converted design patterns using the second conversion model, comparing the plurality of converted design patterns with the design image pattern to determine misalignment therebetween, obtaining, for each of the plurality of training patterns, effective distances which are smallest values of distances from each of the plurality of training patterns to a pattern that is misaligned, extracting one of the plurality of training patterns having a maximum effective distance as an optimal training pattern, deleting the samples that are within the maximum effective distance in the optimal training pattern, and determining whether all the samples are aligned.

According to another aspect of the inventive concept, there is provided a training SEM equipment alignment method including obtaining a plurality of SEM images for a measurement target using SEM equipment, performing preprocessing on the plurality of SEM images and corresponding design images, selecting training SEM images from the plurality of SEM images, performing training based on the training SEM images and corresponding training design images to generate a first conversion model between the plurality of SEM images and the corresponding design images, converting the plurality of SEM images into first converted design images using the first conversion model, comparing and aligning the first converted design images with the corresponding design images to extract alignment coordinate values, and determining a measurement error of the SEM equipment based on the alignment coordinate values, wherein the selecting the training SEM images includes setting a plurality of patterns of the plurality of SEM images as samples, performing training on each of a plurality of training patterns to generate a second conversion model between a design image pattern and the plurality of training patterns, converting the plurality of training patterns into a plurality of converted design patterns using the second conversion model, comparing the plurality of converted design patterns with the design image pattern to determine misalignment therebetween, obtaining, for each of the plurality of training patterns, effective distances which are smallest values of distances from each of the plurality of training patterns to a pattern that is misaligned, extracting one of the plurality of training patterns having a maximum effective distance as an optimal training pattern, deleting the samples that are within the maximum effective distance in the optimal training pattern, and determining whether all the samples are aligned.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
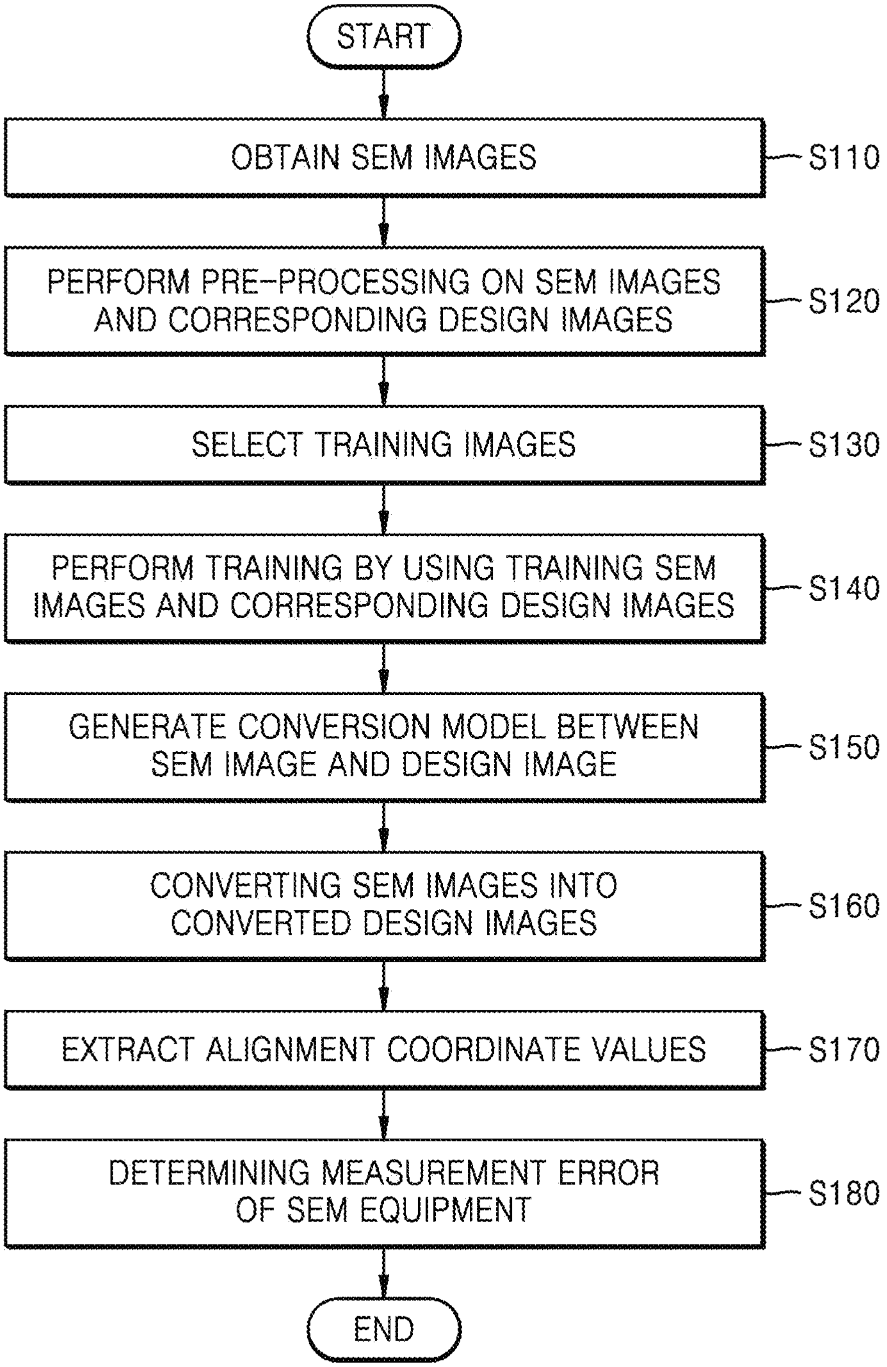
FIG. 1 is a flowchart schematically illustrating a scanning electron microscope (SEM) equipment alignment method according to an embodiment.

Hereinafter, various embodiments of the inventive concept are described in detail with reference to the accompanying drawings. The same reference numerals denote the same elements in the drawings, and the descriptions of the same elements are omitted.

FIG. 1 is a flowchart schematically illustrating a scanning electron microscope (SEM) equipment alignment method according to an embodiment.

Referring to FIG. 1, an SEM equipment alignment method according to an embodiment (hereinafter, simply referred to as 'alignment method') may firstly obtain SEM images of devices or wiring patterns on a semiconductor substrate such as a wafer (S110). The SEM image may be obtained by an SEM measurement device 110 in FIG. 9A. For example, the SEM measurement device 110 includes a measuring device in which electrons emitted from an electron gun are focused on lenses to generate an electron beam, a sample to be inspected is scanned by the electron beam by using a scanning coil, and an SEM image corresponding to the sample is obtained by detecting secondary electrons (SE) and back scattered electrons (BSE) that are emitted from the sample. The lenses may include magnetic lenses having electromagnets (electronic lenses) instead of optical lenses, and the resolution of the magnetic lens may be higher as the diameter of the electron beam decreases, so that the lenses may observe the sample up to hundreds of thousands of times and the SEM image may be obtained as a three-dimensional image of the sample. The SEM measurement device 110 is described in more detail with reference to FIG. 9A.

The SEM image may have a bitmap file format. For example, the SEM image may have a bitmap file format such as a bitmap (BMP) format, a tagged image file format (TIFF), and a joint photographic expert group (JPEG) format. The image file may be largely divided into a bitmap file format and a vector file format. The bitmap file format refers to an image file format in which an image is configured by a quadrangular pixel. Since each pixel of a bitmap image gives different colors, the gray level or the color difference may be accurate in the whole image, and thus, various colors may be shown in the image. In addition, the color may be easily changed in each pixel, and thus, image correction and synthesis may also be easily performed. However, since the number of pixels in the image is fixed, the original pixels of the image may be lost when the size of the image is changed or the image is compressed, and accordingly, image quality may deteriorate when the image is excessively enlarged/reduced or continuously compressed and stored.

In contrast, the vector file format is an image file format in which an image is constructed by values of line segments connecting points and points, so that the vector image is expressed by lines and surfaces that are defined based on coordinate values of the points and lines and curve values of the surfaces, which are obtained by mathematical calculation in an x, y coordinate system. Since the vector image is reconstructed by the mathematical calculation without using pixels, image quality may not easily deteriorate and the original image quality may be maintained without any damages to the image even when the image is sufficiently enlarged, so that the vector image may be free to the size adjustment and the curve deformation and a deformation process such as a morphing and animation may be easily performed on the vector image. However, the vector file format may be difficult to express a fine picture or gradual changes in color and have low speed when an effect is applied to the image, so that the vector image is difficult to perform natural synthesis with other images.

The devices or wiring patterns on semiconductor substrates may be formed by a photolithography process based on design images such as computer-aided design (CAD) images. The CAD image may have a file format, for example, a graphic data system (GDS) format or a GDSII format. The GDS file format may be a kind of a binary file format and include a standard database file format for data exchange in an integrated circuit (IC) or IC-layout artwork. The GDS file format may include a variety of information on a layout of planar geometric shapes, a text label, and a hierarchical form.

Then, after obtaining the SEM images, a pre-processing may be performed on the SEM images and the corresponding design images (S120). For example, a measurement information file for the SEM images may be generated and the design images may be converted into a bitmap file format in the pre-processing process. The measurement information file may include some information such as measured coordinate values, a field of view (FOV), a pixel size, and/or rotation, etc. Since the design image is formatted as the GDS file format as described above, the GDS file format may be converted into a digital image file format such as a portable networks graphics (PNG) file format in the pre-processing process. The pre-processing may facilitate the comparison and alignment between the SEM image and the design image in subsequent processes.

After performing the pre-processing, training SEM images may be selected (S130). The training SEM images may be selected from the SEM images. That is, the training SEM images may be generated as a combination of at least some of the SEM images. For example, thousands or tens of thousands of the SEM images may be obtained by the SEM equipment 110, and tens or hundreds of the SEM images may be selected as the training SEM images. Particularly, some of the SEM images in which the pattern and the space are clear may be selected as the training SEM images to increase the accuracy of conversion models generated by training.

The training SEM images may be used for aligning the SEM images with a minimal combination of patterns. Therefore, the SEM images may be efficiently aligned with one another by the training SEM images. The selection of the training SEM images may be described in detail with reference to FIGS. 4 to 8.

After selecting the training SEM images, the training may be performed by using the training SEM images and the corresponding design images (S140). The training may be performed to find an optimal conversion model between the training SEM images and the corresponding training design images. That is, when a training SEM image A corresponds to a training design image B, the training may include a process of finding a conversion model for converting the training SEM image A into another SEM image B', which is almost identical to the training design image B. The training may be performed by artificial intelligence (AI) learning algorithms such as generative adversarial network (GAN) algorithms. The training by using the GAN is described in more detail with reference to FIG. 3.

Thereafter, as a result of the training, a conversion model may be generated between the SEM image and the design image (S150). The conversion model may include an image conversion program or image conversion algorithm that converts an image a into an image. That is, the SEM image may be converted into another SEM image that is substantially identical to the corresponding design image by the conversion model, as described above. Hereinafter, another SEM image, which is converted from a corresponding SEM image by the conversion model, is referred to as 'converted design image'.

After generating the conversion model, the SEM images may be converted into converted design images by the conversion model (S160). In other words, the rest of the SEM images, which are not involved in the training, may be converted into the converted design images by the conversion model.

After generating the converted design images, the design images may be compared and aligned with the converted design images and alignment coordinate values may be extracted (S170). The alignment coordinate value may include a criterion for indicating the degree of deviation between the converted design image and the corresponding design image. For example, the converted design image may be an image corresponding to a pattern on the semiconductor substrate at the same position of the corresponding SEM image. Accordingly, the converted design image and the corresponding SEM image may have the same coordinate value. In case that no errors are in measurement coordinates of the SEM equipment, the converted design image may have to be accurately matched to the design image based on the correspondence between the design image and the converted design image. However, when there are errors in measurement coordinates of the SEM equipment, the pattern on a position of the semiconductor substrate may not be exactly measured when obtaining an SEM image. Accordingly, each position in the SEM image may be deviated or misaligned from the originally intended position, and thus, the converted design image may be a deviated image that is converted from the deviated positions of the deviated SEM image. As a result, the design image may not match the converted design image and the design image and the converted design image may be deviated from each other. Therefore, there is required that the converted design image be aligned with the design image, and the alignment coordinate values may be extracted in an aligning process.

After extracting an alignment coordinate value, a measurement error of the SEM equipment may be determined based on the alignment coordinate values (S180). For example, when the alignment coordinate value is over a preset allowable value, the SEM equipment may be determined to have the measurement error, and when the alignment coordinate value is below the allowable value, the SEM equipment may be determined to be normal. When the SEM equipment has the measurement error, an aligning process for the SEM equipment may be performed.

According to an embodiment of the SEM equipment alignment method, the conversion model may be generated by using the AI learning algorithm, such as the GAN algorithm, and the SEM image may be converted into the converted design image by the conversion model. In addition, some patterns of the SEM image may be combined to generate an effective training SEM image.

Figure 2:
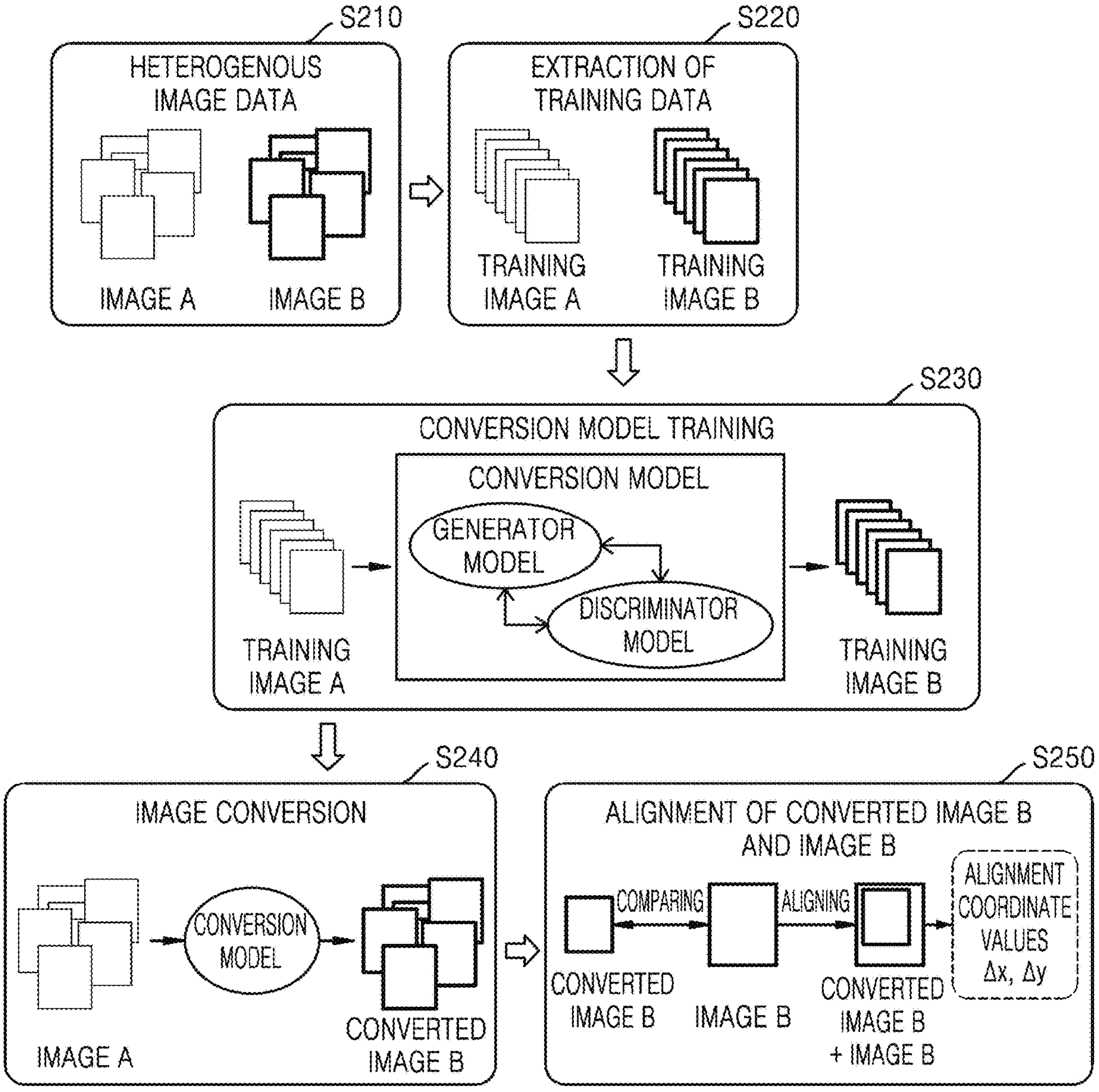
FIG. 2 is a conceptual view illustrating an alignment method shown in FIG. 1.

FIG. 2 is a conceptual view illustrating an alignment method shown in FIG. 1. The descriptions of the same elements as those in the description with reference FIG. 1 are briefly given or omitted.

Referring to FIG. 2, an alignment method according to an embodiment may firstly obtain heterogeneous image data (S210). Operation S210 may correspond to operation S110 of obtaining the SEM images and operation S120 of performing the pre-processing shown in FIG. 1. For example, 'image A' in FIG. 2 may correspond to the SEM images and 'image B' may correspond to the design images. The SEM images and the design images may be heterogeneous image data having different file formats. For example, the SEM images may have a BMP file format and the design images may have a GDS file format. In addition, the image A and the image B may be images on which the pre-processing is performed. Thus, the image B may have an image file format that is changed from the GDS file format, for example, the PNG file format.

Hereinafter, training data is extracted (S220). Operation S220 may correspond to operation S130 of selecting the training SEM images shown in FIG. 1. For example, a training image A may correspond to the training SEM images selected from a plurality of SEM images. In addition, in operation S220, a training image B may be extracted and correspond to training design images selected from a plurality of design images corresponding to training SEM images. Thus, the training design images may be selected in correspondence to the training SEM images, respectively.

Then, the training for generating the conversion model may be performed (S230). Operation S230 may correspond to operation S140 of performing the training and operation S150 of generating the conversion model shown in FIG. 1. The training may be performed by using the GAN algorithm, which is a kind of the AI learning algorithm. The GAN algorithm may include an adversarial generative neural network algorithm that includes a generator model and a discriminator model. A specific operation of the GAN algorithm is described in detail with reference to FIG. 3. The conversion model may be generated by the training based on the GAN algorithm.

Then, the image A may be converted into a converted image B by using the conversion model (S240). Operation S240 may correspond to operation S160 of converting into the converted design image shown in FIG. 1. Herein, the image A may correspond to the SEM images. In addition, the converted image B may be an image that is converted from the SEM images by the conversion model and may have the same or similar file format as the image B. In addition, the converted image B may have a form of the design image corresponding to the SEM image, i.e., the image B. However, as described above, when the SEM equipment may have the measurement error, the converted image B and the image B may not match accurately in position.

Then, the converted image B and the image B may be compared and aligned with each other (S250). Operation S250 may correspond to operation S170 of extracting the alignment coordinate value shown in FIG. 1. Herein, the comparison may correspond to a process of comparing a specific converted image B with a plurality of images B and extracting a corresponding image B. In addition, the alignment may correspond to a process of moving the converted image B in such a way that the converted image B overlaps the image B. For example, the alignment may refer to the process of moving the converted image B by x displacement ($\Delta x$) in the x-axis and y displacement ($\Delta y$) in the y-axis so that the converted image B overlaps the image B. Thus, the moving distance of the converted image B in the x-axis, that is, the x displacement ($\Delta x$) and the moving distance of the converted image B in the y-axis, that is, the y displacement ($\Delta y$) in the alignment process may be determined as the alignment coordinate values. Thereafter, the measurement error of the SEM equipment may be determined by comparing the alignment coordinate value with the preset allowable value.

In operation S250 of comparing and aligning the converted image B and the image B in FIG. 2, the converted image B is shown to be smaller than the image B. This may be because the SEM image is generally obtained to be smaller than the design image and the converted design image, i.e., the converted image B is generated correspondently to the SEM image. Accordingly, a plurality of converted images B may be generated in correspondence to a single design image, that is, the image B. In addition, the image B may include various patterns corresponding to a plurality of converted image B at different positions. However, the position of the converted image B in the image B may be different from an actual position of the converted image B, which is actually generated, due to the measurement error of the SEM equipment. In some embodiments, a single converted image B may be generated correspondently to a single design image, i.e., a single image B.

Figure 3:
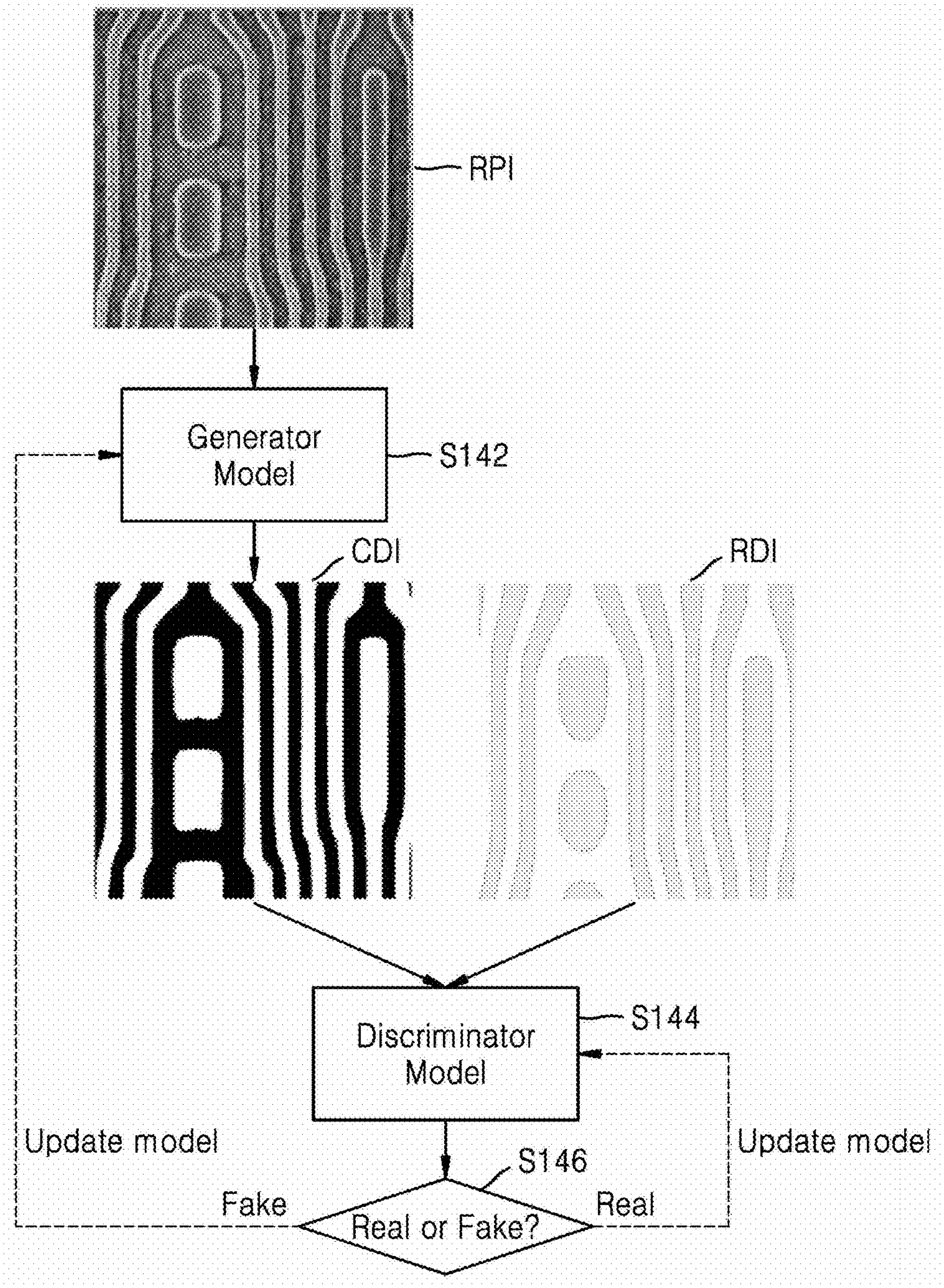
FIG. 3 is a conceptual view illustrating a process of generating a conversion model by using a generative adversarial network (GAN) algorithm in the alignment method shown FIG. 1.

FIG. 3 is a conceptual view illustrating a process of generating a conversion model by using a GAN algorithm in the alignment method shown FIG. 1.

Referring to FIG. 3, the GAN algorithm may be a deep learning-based generative algorithm and may include two sub-models. That is, the GAN algorithm may include a generator model and a discriminator model. The generator model may generate new examples, and the discriminator model may determine whether the example is a real data or a fake data generated by the generator model.

For example, the generator model may convert the real image to generate a converted design image, the converted design image may be compared with a real design image, and it may be determined whether the converted design image is a real design image or a fake design image that is generated from the generator model in the discriminator model. Specifically, in FIG. 3, when a real pattern image RPI indicating actual patterns on the semiconductor substrate is input into the generator model, the generator model may generate a converted design image CDI (S142). In addition, when the converted design image CDI and the real design image RDI are input into the discriminator model, the discriminator model determines whether the converted design image CDI is the same as or different from the real design image RDI, that is, whether the converted design image CDI is a real design image or a fake design image (S144). Thereafter, the generator model and the discriminator model may be continuously updated according to the determination result (S146). When the discriminator model reaches such a level that the converted design image CDI and the real design image RDI are not distinguished any more by repeating operations S142, S144 and S146 described above, the training may be over and the generator model may be adopted as the final generation model or the conversion model. The discriminator model may be discarded when the training is over.

To better understand the operation of the GAN algorithm, the generator model is assumed to be a counterfeiter and the discriminator model is assumed to be a policeman. Thus, the counterfeiter is set to make fake money that is not distinguished from real money, and the policeman is set to distinguish real money from fake money well. Therefore, the counterfeiter and the policeman compete, and in terms of game theory, they are adversarial and have effects on each other as if they played a zero-sum game. In other words, when the policeman successfully distinguishes between fake money and real money, the policeman does not need to update the parameters for the distinction. In contrast, the counterfeiter needs to update many parameters for forgery. Conversely, when the counterfeiter successfully makes fake money and the policeman cannot distinguish between fake money and real money, the counterfeiter does not need to update the parameters for forgery. In contrast, the policeman needs to update many parameters for distinction. When the above-mentioned process continues to be repeated, the forgery may reach such a level that the police cannot distinguish between fake money and real money, and the forgery method may be a final generation model or a final conversion model.

Figure 4:
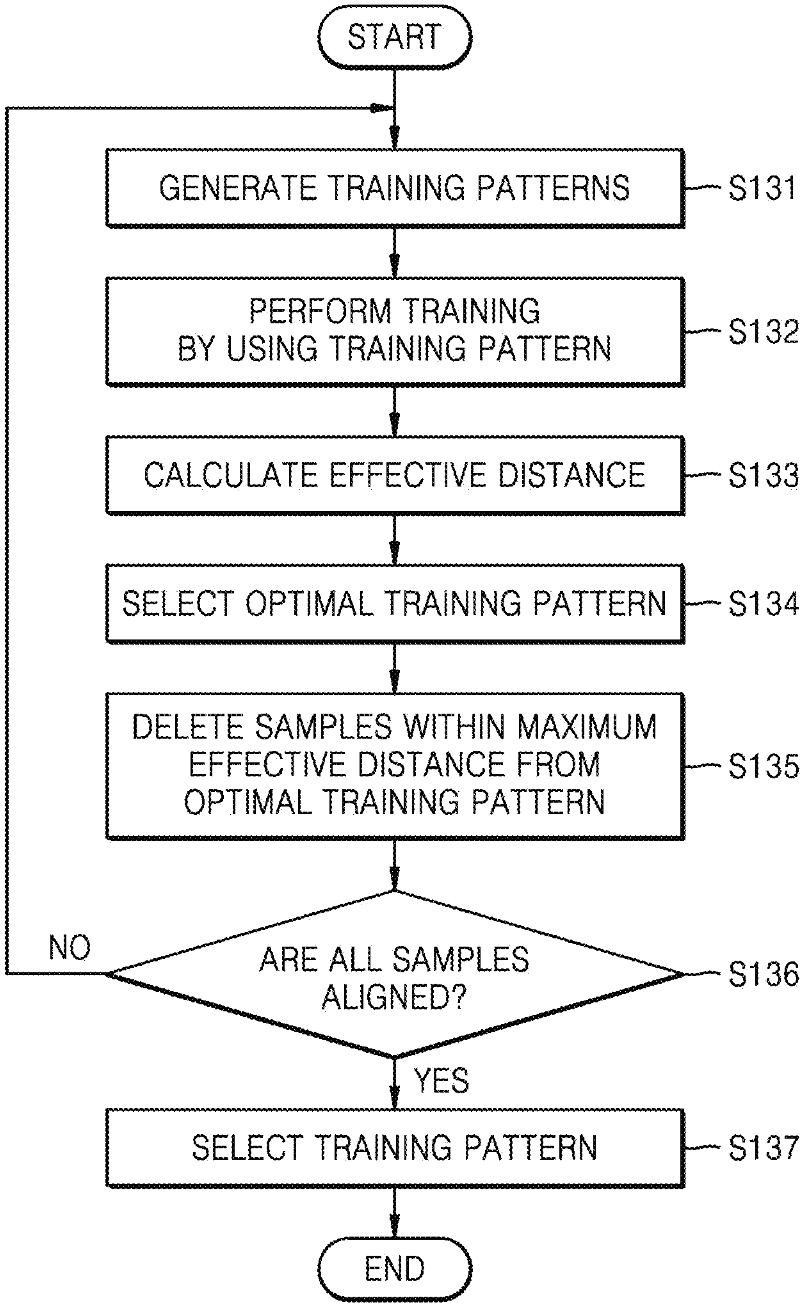
FIG. 4 is a flowchart showing a method of selecting training SEM images of the alignment method in FIG. 1.

FIG. 4 is a flowchart showing a method of selecting training SEM images of the alignment method in FIG. 1.

Referring to FIG. 4, at first, a plurality of training patterns may be generated (S131). The plurality of training patterns may have different shapes or different sizes. For example, each of the plurality of training patterns may have a line and space shape. The lines of the training patterns may have different widths and/or the space of the training patterns, which is a gap distance between neighboring lines, may have different widths. In another embodiment, each of the plurality of training patterns may have any other shapes different from the line and space shape.

The SEM image may include a plurality of patterns. All the plurality of patterns of the SEM image may be selected as a sample, or at least some of the plurality of patterns of the SEM image may be selected as the training pattern. For example, all the plurality of patterns of the SEM image may be set as the training pattern. Accordingly, the plurality of patterns of the SEM image may be set as the sample or the training pattern.

Thereafter, the training may be performed individually by using a plurality of training patterns (S132). Each of the plurality of training patterns may be independently used for the training. Operation S132 may correspond to operation S140 of performing the training, operation S150 of generating the conversion model, operation S160 of converting to the converted design image, operation S170 of extracting the alignment coordinate value, and operation S180 of determining the measurement error shown in FIG. 1.

That is, a plurality of trainings may be independently performed by individually using the plurality of training patterns to thereby generate the conversion model, and then, a plurality of inferred patterns individually corresponding to the plurality of patterns of the SEM image may be obtained by using the conversion model. That is, a plurality of the trainings may be performed independently on each of the plurality of training patterns, to thereby obtain the plurality of inferred patterns corresponding to each sample.

After performing the training, an effective distance of each training pattern may be calculated (S133). The effective distance may indicate the smallest value of the distances from each of the plurality of training patterns to a pattern that fails to be aligned after placing the pattern of the SEM image on a coordinate plane. The alignment-failed pattern may indicate a case that the shapes of the inferred pattern and the design pattern are different, a case that the absolute positions of the inferred pattern and the design pattern are different, and/or a case that the relative positions of the inferred pattern and the design pattern are different. Herein, the inferred pattern may also be referred to as a pattern of the converted design image.

For example, in case of the pattern that fails to be aligned, the shapes of the inferred pattern and the SEM pattern may be different. For example, in case of a pattern that is successfully aligned, the shapes of the inferred pattern and the SEM pattern may be substantially the same.

The plurality of training patterns may independently and respectively have a plurality of effective distances. At least two effective distances among the plurality of effective distances may be different from each other.

Then, a training pattern corresponding to the largest effective distance is selected from among the plurality of training patterns (S134). For example, the selected training pattern may be the optimal training pattern, and the effective distance corresponding to the optimal training pattern may be the maximum effective distance.

Thereafter, all samples, which are arranged within the maximum effective distance from the optimal training pattern, may be deleted (S135). That is, the sample may be updated. As defined above, since the effective distance may indicate the smallest value of the distances from the training pattern to the pattern that fails to be aligned, all samples, which are spaced apart from the optimal training pattern by a gap distance less than or equal to the maximum effective distance, may be determined as being aligned sufficiently. Herein, the optimal training pattern may also be deleted from the sample.

Thereafter, it may be determined whether all samples are aligned (S136). When all samples are aligned, one or more optimal training patterns may be synthesized, and the synthesized optimal training patterns may be selected as a training SEM image (S137). In contrast, when at least some of the samples are not aligned, operation S131 to operation S135 may be repeated until the samples are finally aligned, and the optimal training pattern is additionally selected.

The conventional training SEM image selection method is generally performed with low efficiency due to manual selection of the patterns. In addition, when a model trained with the training SEM image fails to align at least some of the SEM images, a process of selecting the training SEM image may be additionally required.

However, the training SEM image selection method according to an embodiment may select the training SEM image quickly and accurately by sequentially performing the selection of a plurality of training patterns and the calculation of the effective distances for each of the training patterns.

FIGS. 5A to 5D are conceptual views illustrating SEM images, for which whether the SEM images are aligned is determined after performing training by using the training pattern in FIG. 4, and converted design images corresponding to the SEM images. Detailed descriptions of the same elements as those in the description with reference FIG. 4 are briefly given or omitted.

Referring to FIGS. 5A to 5D, each of the figures shows the SEM image and the converted design image. In each diagram of FIGS. 5A to 5D, the upper portion represents the SEM image, and the lower portion represents the converted design image. In each diagram of FIGS. 5A to 5D, the SEM image and the converted design image may correspond to each other. For example, each of the plurality of patterns may have a line-and-space structure in each image. Widths of the lines and/or the spaces in the patterns shown in FIGS. 5A to 5D may be different from one another.

Figure 5A:
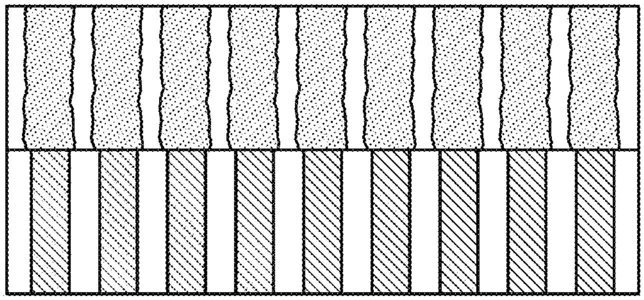
FIGS. 5A to 5D are conceptual views illustrating SEM images, for which whether the SEM images are aligned is determined after performing training by using a training pattern in FIG. 4 and converted design images corresponding to the SEM images.

For example, the training may be performed by using the SEM image in FIG. 5A. Herein, the training may correspond to operation S140 of performing the training, operation S150 of generating the conversion model, operation S160 of converting to the converted design image, operation S170 of extracting the alignment coordinate value, and operation S180 of determining the measurement error, as shown in FIG. 1.

Figure 5B:
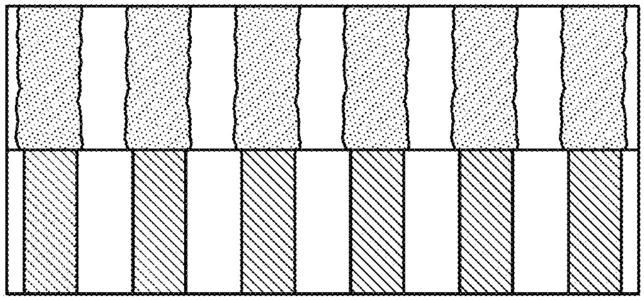

FIGS. 5A and 5B show patterns of the converted design images that are successfully aligned and the SEM patterns corresponding thereto. In contrast, FIGS. 5C and 5D show patterns of the converted design images that fail to be aligned and the SEM patterns corresponding thereto.

Each pattern of the converted design image in FIGS. 5A and 5B is substantially identical in shape to each pattern of the SEM image in FIGS. 5A and 5B. Although the pattern width of the SEM image is different from that of the converted design image in FIGS. 5A and 5B, the number of lines and spaces of the pattern of the SEM image is the same as those of the pattern of the converted design image.

Figure 5C:
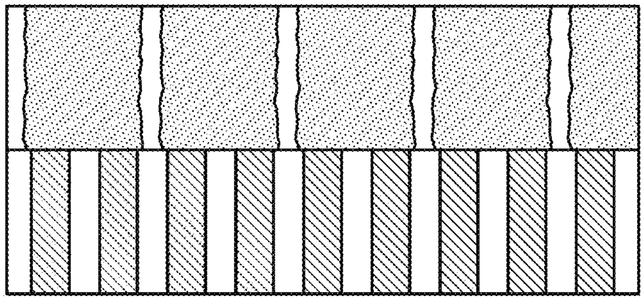
Figure 5D:
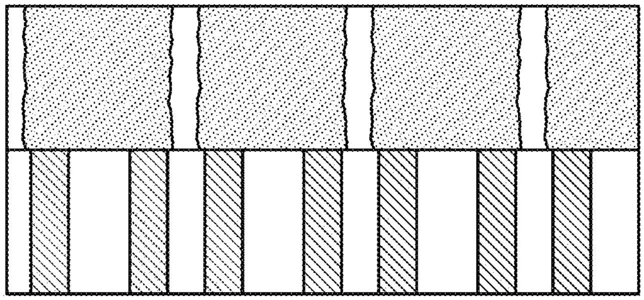

However, in FIGS. 5C and 5D, each pattern of the SEM image may be different in configuration from each pattern of the converted design image. For example, in FIGS. 5C and 5D, the number of lines and spaces of the pattern of the SEM image may be different from those of the pattern of the converted design image. In FIGS. 5C and 5D, the pattern of the converted design image corresponding to a single line of the pattern of the SEM image may be shown as a pair of spaced lines.

Figure 6A:
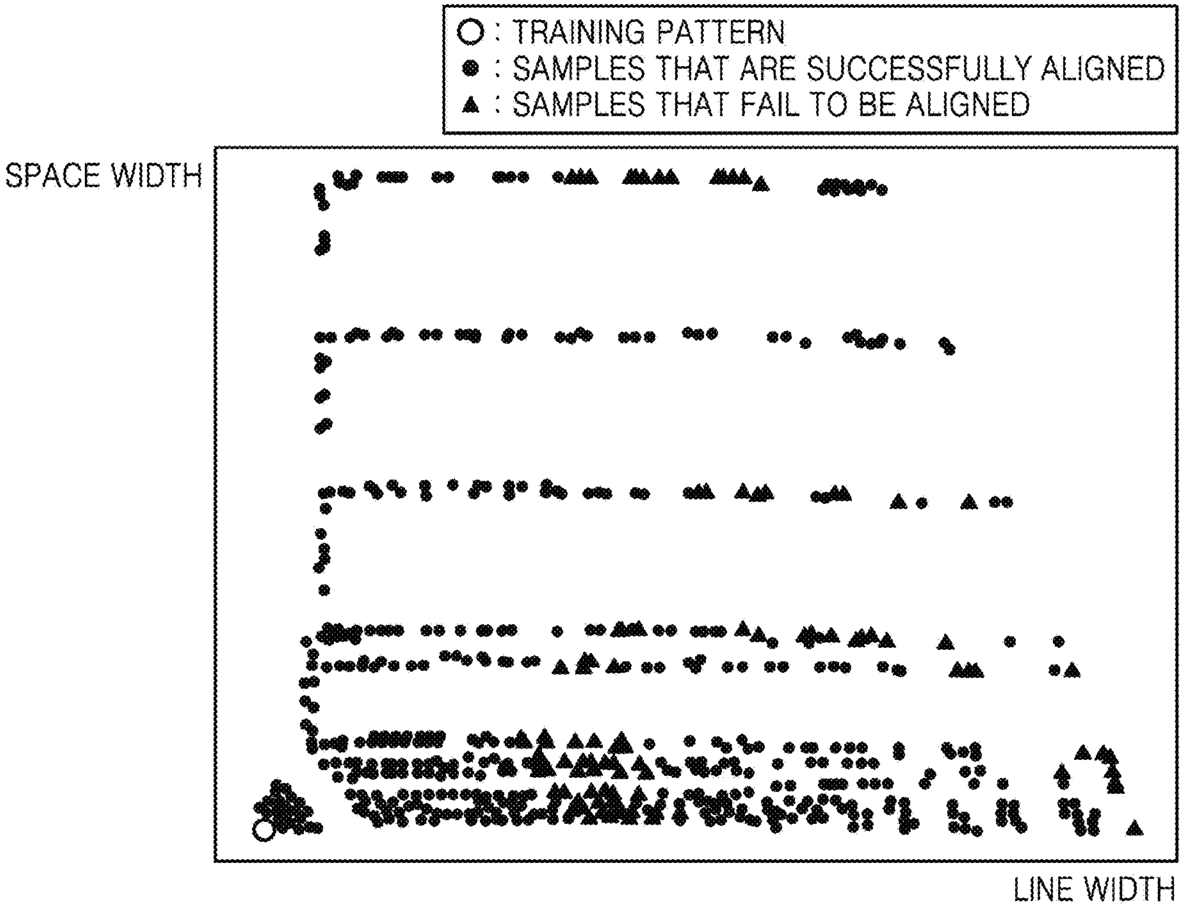
FIGS. 6A and 6B are graphs for describing the effective distance in FIG. 4.
Figure 6B:
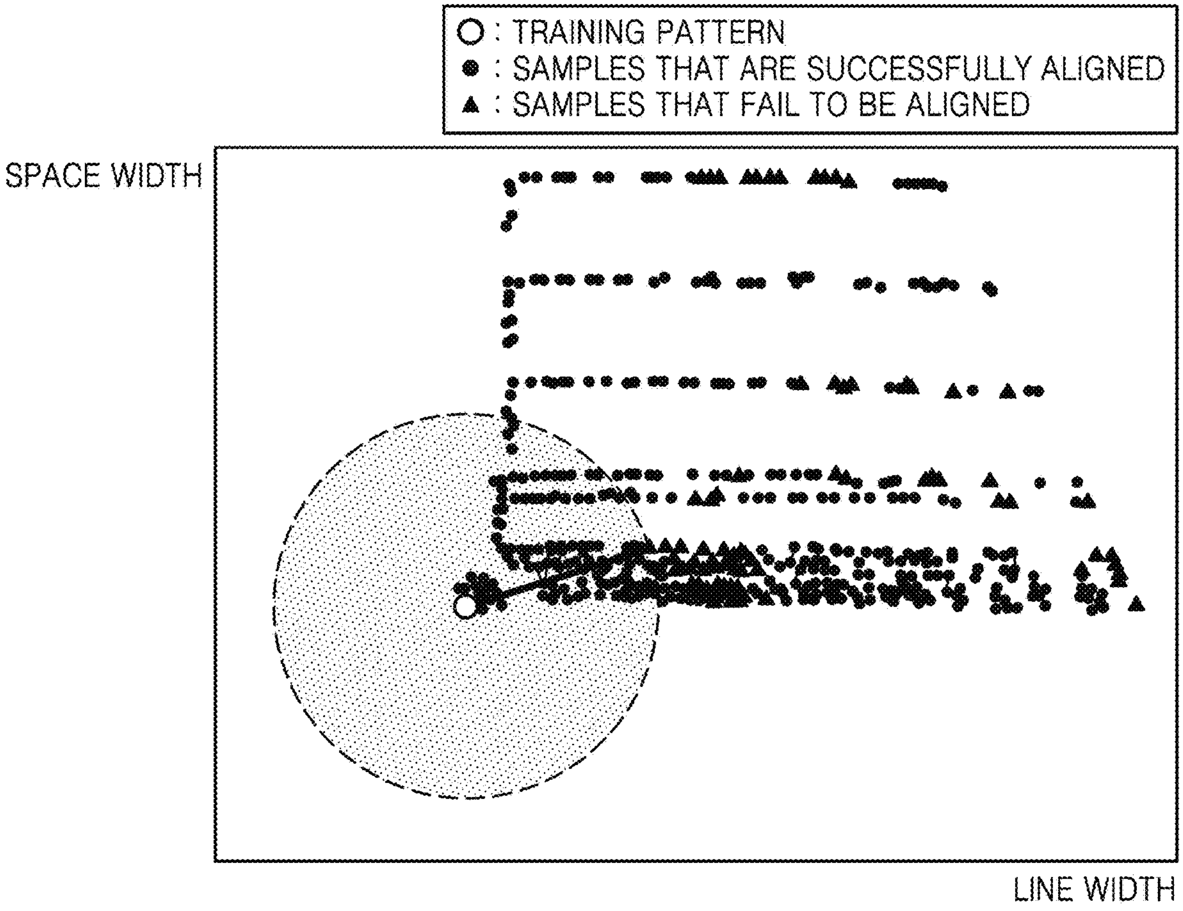

FIGS. 6A and 6B are graphs for describing the effective distance in FIG. 4. In FIGS. 6A and 6B, the descriptions of the same elements as those in the description with reference FIG. 4 are briefly given or omitted. In the graphs, the horizontal axis indicates the width of the line, and the vertical axis indicates the width of the space.

In FIGS. 6A to 7C, a void circle indicates a training pattern, a filled circle indicates a sample that is successfully aligned, and a triangle indicates a sample that fails to be aligned.

Referring to FIG. 6A, a plurality of samples is shown on the graphs. For example, the plurality of samples may include a plurality of patterns in the SEM image. The conversion model may be generated for each training pattern and a plurality of samples may be converted and aligned by the conversion model, to determine whether each sample is aligned.

Referring to FIG. 6B, as described above, the smallest value of the distances from each training pattern to the pattern that fails to be aligned is defined as the effective distance. Then, a circle may be drawn in such a way that the training pattern is used as the center of the circle and the effective distance is used as the radius of the circle and a plurality of samples in the circle may be deleted. Accordingly, a plurality of samples may be updated.

By repeating the training process, the alignment process, and the deletion process several times, the training pattern in which all samples are aligned may be selected and combined.

Figure 7A:
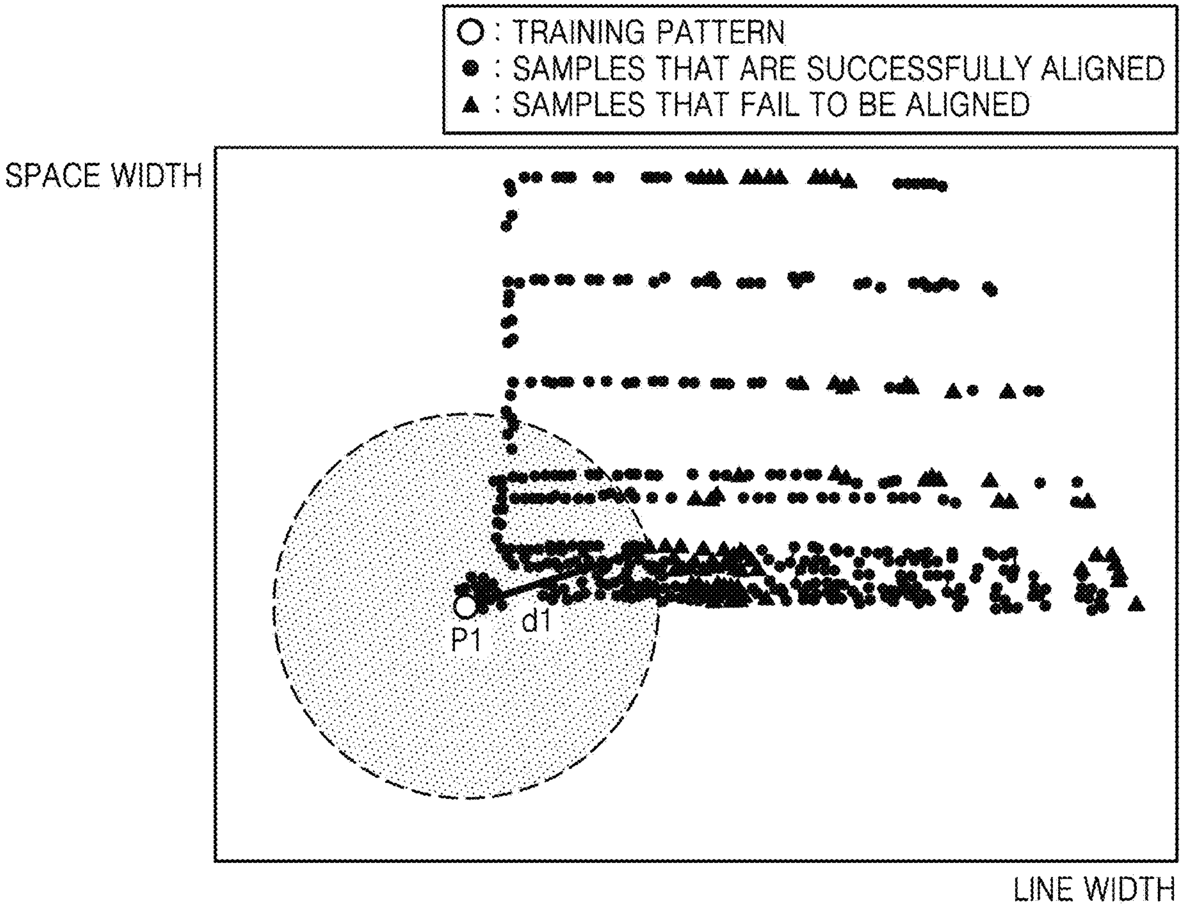
FIGS. 7A to 7C are graphs showing a method of selecting the training pattern having the maximum effective distance shown in FIG. 4.
Figure 7B:
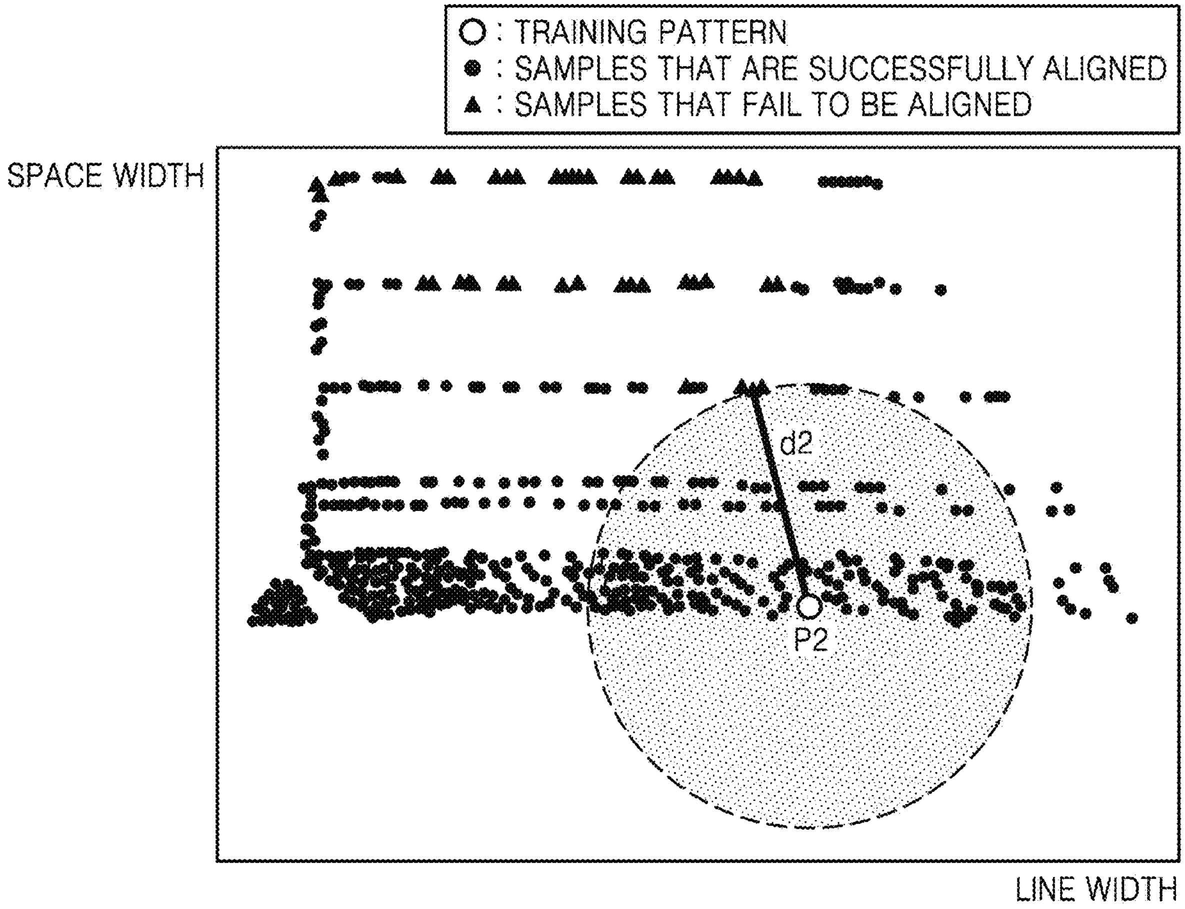
Figure 7C:
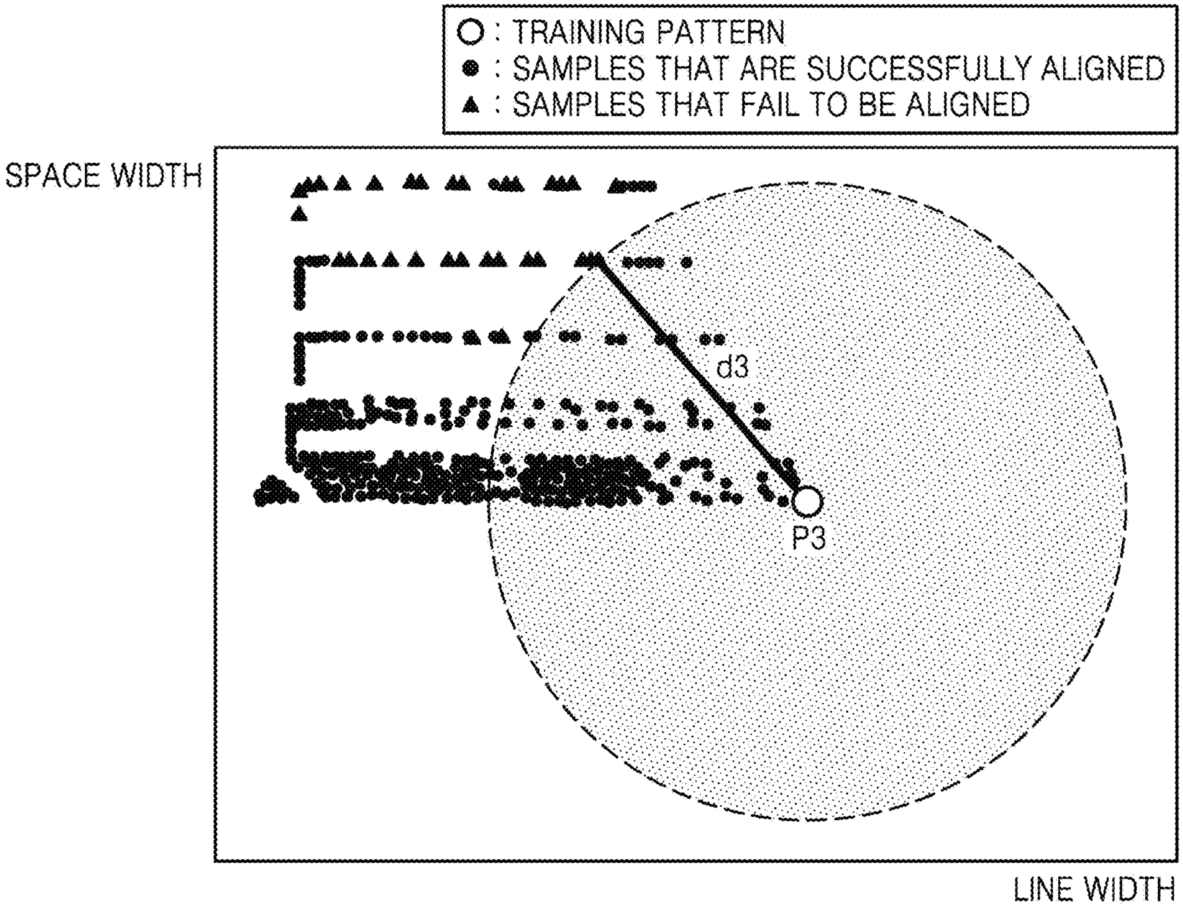

FIGS. 7A to 7C are graphs showing a method of selecting the training pattern having the maximum effective distance shown in FIG. 4. The descriptions are given with reference to FIGS. 7A to 7C together with FIGS. 4 to 6B.

Referring to FIGS. 7A to 7C, regarding the samples in FIG. 6A, first to third effective distances d1, d2, and d3 may be calculated corresponding to first to third training patterns P1, P2, and P3, respectively. As described above, the first to third training patterns P1, P2, and P3 may have different line widths and/or different space widths, wherein a space is a distance between neighboring lines.

For example, the first training pattern P1 may have a first line width and a first space width, the second training pattern P2 may have a second line width and a second space width, and the third training pattern P3 may have a third line width and a third space width.

For example, the dashed circle in FIG. 7A may have a center at the first training pattern P1 and a radius corresponding to the first effective distance d1 corresponding to the first training pattern P1. In addition, the dashed circle in FIG. 7B may have a center at the second training pattern P2 and a radius corresponding to the second effective distance d2 corresponding to the second training pattern P2. Furthermore, the dashed circle in FIG. 7C may have a center at the third training pattern P3 and a radius corresponding to the third effective distance d3 corresponding to the third training pattern P3. Since the third effective distance d3 is greater than the first effective distance d1 and the second effective distance d2, the third effective distance d3 may be selected as the maximum effective distance. Therefore, the third training pattern P3 corresponding to the third effective distance d3 may be selected as the optimal training pattern.

In FIGS. 7A to 7C, there are described that the training is performed by using three training patterns, i.e., the first to third training patterns P1, P2, and P3, each training pattern is determined whether to be aligned, and the effective distances corresponding to the training patterns P1, P2, and P3, respectively, are compared, but the inventive concept is not limited thereto. For example, two training patterns or four or more training patterns may be compared with one another, to determine whether the two training patterns or four or more training patterns are aligned and to compare the effective distances corresponding to each of two training patterns or four or more training patterns.

Figure 8:
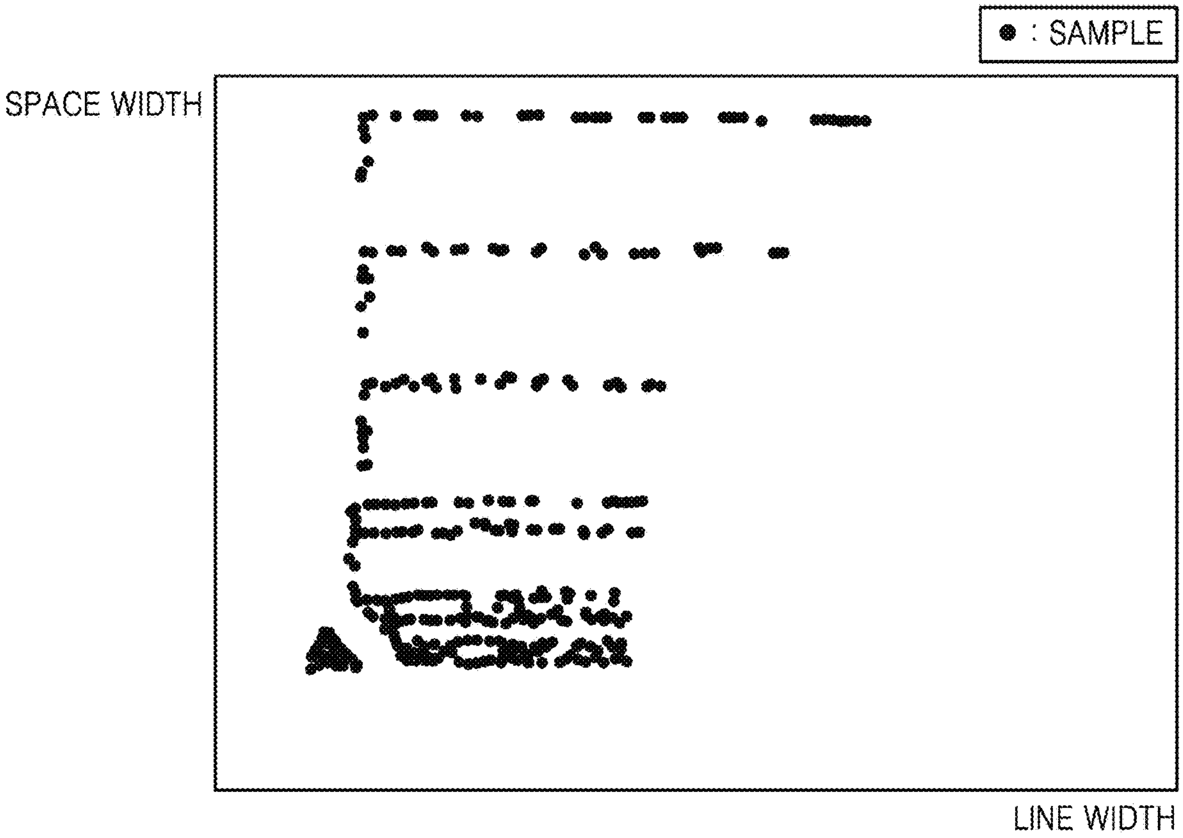
FIG. 8 is a graph showing that patterns that are within a maximum effective distance in an optimal training pattern are deleted from samples.

FIG. 8 is a graph showing that patterns within the maximum effective distance in the optimal training pattern are deleted from the samples. In FIG. 8, the filled circle indicates an updated sample.

Referring to FIGS. 7C and 8, since the third effective distance d3 in FIG. 7C is the maximum effective distance, all samples in the circle having a center at the third training pattern P3 and a radius of the third effective distance d3 may be deleted. Accordingly, the sample may be updated, and operations S131 to S135 in FIG. 4 may be repeatedly performed on the updated sample.

Figure 9A:
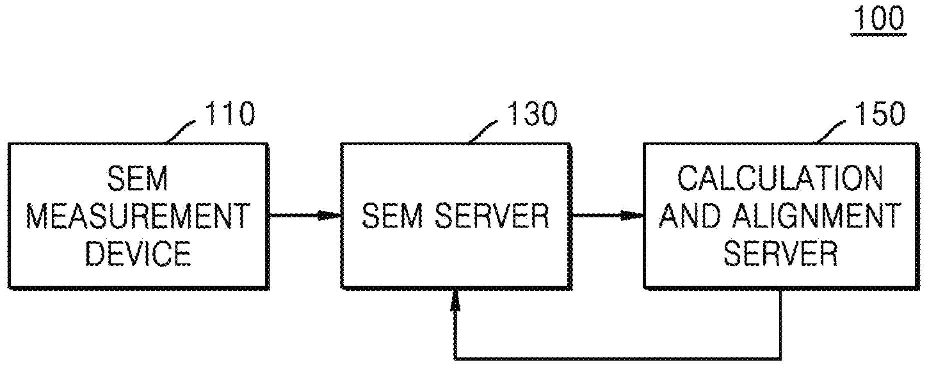
FIG. 9A is a block diagram showing an alignment apparatus of SEM equipment according to an embodiment.
Figure 9B:
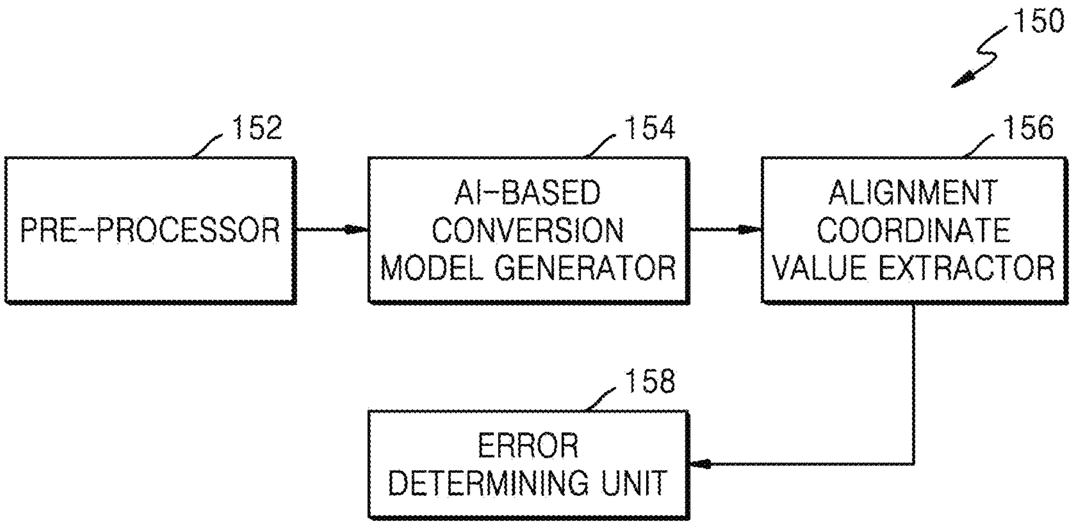
FIG. 9B is a block diagram showing a calculation server of the alignment apparatus of the SEM equipment in FIG. 9A in more detail.

FIG. 9A is a block diagram showing an alignment apparatus of SEM equipment according to an embodiment, and FIG. 9B is a block diagram showing a calculation server of the alignment apparatus of the SEM equipment in FIG. 9A in more detail. The descriptions of the same elements as those in the description with reference FIGS. 1 to 8 are briefly given or omitted.

Referring to FIGS. 9A and 9B, the alignment apparatus 100 of the SEM equipment according to an embodiment may include an SEM measurement device 110, an SEM server 130, and a calculation and alignment server 150.

The SEM measurement device 110 may include a device for taking a picture of the patterns, which are arranged on a semiconductor substrate, as an SEM image. More particularly, the SEM measurement device 110 may include an electron gun, an anode, a magnetic lens, a scanning coil, a first detector, a second detector, a scanner, and a stage. The electron gun may include, for example, a Schottky type or a thermoelectric emission type. An electron beam may be emitted by applying an acceleration voltage to the electron gun. The anode may include an acceleration electrode, and the electron beam may be accelerated by a voltage applied between the electron gun and the anode. The magnetic lens may focus and accelerate the electron beam. The scanning coil may scan the electron beam one-dimensionally or two-dimensionally on a semiconductor substrate that is a specimen to be measured. The first detector may detect backward scattered electrons (BSE) that are emitted from the semiconductor substrate by the electron beam irradiation, and the second detector may detect secondary electrons (SE) that are generated from the semiconductor substrate by the electron beam irradiation. The scanner may analyze detection signals for the electrons that are detected from the first and second detectors and may generate an image of the patterns on the semiconductor substrate, that is, the SEM image. The stage may be a device on which the semiconductor substrate is located, and thus, the semiconductor substrate may be positioned on an upper surface of the stage and supported by the stage and may move along with the movement of the stage.

The SEM server 130 may control all operations of the SEM measurement device 110 and transfer the SEM image, which is obtained from the SEM measurement device 110, and data related to the SEM image measurement to the calculation and alignment server 150. For example, the data related to SEM image measurement may include data on measurement coordinates, field of view (FOV), pixel size, rotation, etc. The SEM image may be obtained by the SEM measurement device 110 based on the measurement coordinates stored in the SEM server 130. When there is an error in the measurement coordinates stored in the SEM server 130, the SEM image obtained by the SEM measurement device 110 may include a position error, and thus, the SEM image may deviate from the corresponding design image. Therefore, the SEM measurement device 110 or the SEM equipment 100 may be aligned by correcting the measurement coordinates in the SEM server 130, so that the SEM measurement device 110 may obtain the SEM image at the correct measurement coordinates.

The calculation and alignment server 150 may perform various operations, such as the pre-processing on the design images corresponding to the SEM images, the selection of the training SEM images, the training by using the GAN algorithm to thereby generate conversion models, the generation of the converted design images, and the extraction of the alignment coordinate values by comparison and alignment. After extracting the alignment coordinate values, the alignment coordinate values may be fed back to the SEM server 130, and thus, the measurement coordinates stored in the SEM server 130 may be corrected.

Referring to FIG. 9B, the calculation and alignment server 150 may include a pre-processor 152, an AI-based conversion model generator 154, an alignment coordinate value extractor 156, and an error determining unit 158. The pre-processor 152 may perform a pre-processing on the design images corresponding to the SEM images. The pre-processing on the SEM images may include, for example, generation of a measurement information file. The pre-processing on the design images may include, for example, conversion of a file format. The AI-based conversion model generator 154 may select the training SEM images and the actual training images corresponding to the training SEM images and perform the training by using the GAN algorithm. In addition, the conversion model may be generated as a result of the training. The AI-based conversion model generator 154 may calculate a plurality of effective distances for each of a plurality of training patterns, update a sample, and generate an optimal training pattern. The alignment coordinate value extractor 156 may convert the SEM images into the converted design images by using the conversion model. In addition, the converted design images may be compared and aligned with the corresponding design images, to thereby extract the alignment coordinate values. The error determining unit 158 may check whether the SEM equipment has the measurement error by comparing the extracted alignment coordinate values with the preset allowable value. In addition, when determining that there is a measurement error in the SEM equipment, the error determining unit 158 may feedback the alignment coordinate value to the SEM server 130.

Until now, the inventive concept has been described with reference to the embodiments illustrated in the drawings, but this is only an example, and those of ordinary skill in the art will understand that various modifications and equivalent other embodiments are obtainable therefrom. Therefore, the true technical scope of protection of the disclosure should be determined by the technical idea of the appended claims.

While the inventive concept has been particularly shown and described with reference to embodiments thereof, it will be understood that various changes in form and details may be made therein without departing from the scope of the following claims.

What is claimed is:

1. A training scanning electron microscope (SEM) image selection method comprising: setting a plurality of patterns of SEM images as samples;

performing training on each of a plurality of training patterns to generate a conversion model between a design image pattern and the plurality of training patterns;

converting the plurality of training patterns into a plurality of converted design patterns using the conversion model;

comparing the plurality of converted design patterns with the design image pattern to determine misalignment therebetween;

obtaining, for each of the plurality of training patterns, an effective distance which is a smallest distance of distances measured from the respective training pattern to a pattern that is misaligned;

extracting one of the plurality of training patterns having a maximum effective distance as an optimal training pattern;

deleting one or more of the samples that are within the maximum effective distance from the optimal training pattern; and determining whether the samples are aligned.

2. The training SEM image selection method of claim 1, wherein each of the plurality of training patterns comprises at least some of the plurality of patterns of the SEM image.

3. The training SEM image selection method of claim 1, wherein at least some of the plurality of training patterns have a line and space shape.

4. The training SEM image selection method of claim 3, wherein widths of lines or spaces of the plurality of training patterns are different from one another.

5. The training SEM image selection method of claim 1, wherein in the obtaining the effective distances, in at least one of a case that a pattern of the design image and a pattern of one of the plurality of converted design patterns corresponding to the design image are different in shape, a case that the pattern of the design image and the pattern of the one of the plurality of converted design patterns corresponding to the design image are different in absolute position, and/or a case that the pattern of the design image and the pattern of the one of the plurality of converted design patterns corresponding to the design image are different in relative position, the pattern of the SEM image is determined as an alignment-fail pattern that is misaligned.

6. The training SEM image selection method of claim 1, wherein the determining of whether all the samples are aligned comprises, when at least one undeleted pattern remains in the samples, updating the at least one undeleted remaining pattern as the sample.

7. The training SEM image selection method of claim 6, wherein the determining of whether all the samples are aligned comprises, when the patterns are not found in the updated sample, setting a combination of one or more SEM images corresponding to one or more of the optimal training patterns as a training SEM image.

8. The training SEM image selection method of claim 1, wherein the conversion model is generated using a generative adversarial network (GAN) algorithm.

9. A training scanning electron microscope (SEM) image selection method comprising: obtaining a plurality of SEM images for a measurement target using SEM equipment;

performing pre-processing on the plurality of SEM images and corresponding design images;

selecting training SEM images from the plurality of SEM images;

performing training based on the training SEM images and corresponding training design images to generate a first conversion model between the plurality of SEM images and the corresponding design images; and converting the plurality of SEM images into converted design images using the first conversion model, wherein the selecting the training SEM images comprises:

setting a plurality of patterns of the plurality of SEM images as samples;

performing training on each of a plurality of training patterns to generate a second conversion model between a design image pattern and the plurality of training patterns;

converting the plurality of training patterns into a plurality of converted design patterns using the second conversion model;

comparing the plurality of converted design patterns with the design image pattern to determine misalignment therebetween;

obtaining, for each of the plurality of training patterns, an effective distance which is a smallest distance of distances measured from the respective training pattern to a pattern that is misaligned;

extracting one of the plurality of training patterns having a maximum effective distance as an optimal training pattern;

deleting one or more of the samples that are within the maximum effective distance from the optimal training pattern; and determining whether the samples are aligned.

10. The training SEM image selection method of claim 9, wherein each of the plurality of training patterns comprises at least some patterns of the plurality of SEM images and has a line and space shape.

11. The training SEM image selection method of claim 9, wherein one or more optimal training patterns are extracted until all the samples are deleted and one or more of the plurality of SEM images corresponding to the optimal training patterns, respectively, is set as a training SEM image.

12. The training SEM image selection method of claim 9, wherein deleting one or more of the samples comprises deleting the optimal training pattern from the samples.

13. The training SEM image selection method of claim 9, wherein the performing the pre-processing comprises generating a measurement information file for the plurality of SEM images and converting the design images into a bitmap file format.

14. The training SEM image selection method of claim 9, wherein the design image comprises a Computer-Aided Design (CAD) image formatted with a Graphic Data System (GDS) format.

15. A scanning electron microscope (SEM) equipment alignment method comprising: obtaining a plurality of SEM images for a measurement target using SEM equipment;

performing pre-processing on the plurality of SEM images and corresponding design images;

selecting training SEM images from the plurality of SEM images;

performing training based on the training SEM images and corresponding training design images to generate a first conversion model between the plurality of SEM images and the corresponding design images;

converting the plurality of SEM images into first converted design images using the first conversion model;

comparing and aligning the first converted design images with the corresponding design images to extract alignment coordinate values; and determining a measurement error of the SEM equipment based on the alignment coordinate values, wherein the selecting the training SEM images comprises:

setting a plurality of patterns of the plurality of SEM images as samples;

performing training on each of a plurality of training patterns to generate a second conversion model between a design image pattern and the plurality of training patterns;

converting the plurality of training patterns into a plurality of converted design patterns using the second conversion model;

comparing the plurality of converted design patterns with the design image pattern to determine misalignment therebetween;

obtaining, for each of the plurality of training patterns, an effective distance which is a smallest distance of distances measured from the respective training pattern to a pattern that is misaligned;

extracting one of the plurality of training patterns having a maximum effective distance as an optimal training pattern;

deleting one or more of the samples that are within the maximum effective distance from the optimal training pattern; and determining whether the samples are aligned.

16. The SEM equipment alignment method of claim 15, wherein a number of lines of a first sample which is an unaligned sample is different from a number of lines of the converted design image corresponding to the first sample.

17. The SEM equipment alignment method of claim 15, wherein a number of lines of a second sample which is an aligned sample is identical to a number of lines of the converted design image corresponding to the second sample.

18. The SEM equipment alignment method of claim 15, wherein each of the plurality of training patterns comprises a plurality of patterns of the SEM image.

19. The SEM equipment alignment method of claim 15, wherein the first conversion model and the second conversion model are generated using a generative adversarial network (GAN) algorithm, the GAN algorithm comprises a generator model and a discriminator model, the generator model generates an initial converted design image for the training SEM images, the discriminator model compares the initial converted design image with the design image and determines whether the initial converted design image is fake or not, the generator model and the discriminator model are complementarily fed back to each other to generate the first conversion model or the second conversion model.

20. The SEM equipment alignment method of claim 15, wherein, when performing the pre-processing, the design image comprises a computer-aided design (CAD) image formatted with a Graphic Data System (GDS) format, a measurement information file is generated for the plurality of SEM images, and the design images are converted into a bitmap file format.

* * * * *